United States Patent
Chen et al.

(10) Patent No.: US 8,599,164 B2
(45) Date of Patent: *Dec. 3, 2013

(54) METHOD FOR FILTERING SIGNALS OF TOUCH SENSITIVE DEVICE

(75) Inventors: Hsi-Kun Chen, Taoyuan County (TW); Kuo-Chen Wu, Taoyuan County (TW); Chun-Wei Lin, Taoyuan County (TW); Ming-San Huang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 641 days.

This patent is subject to a terminal disclaimer.

(21) Appl. No.: 12/332,270

(22) Filed: Dec. 10, 2008

(65) Prior Publication Data

US 2009/0284491 A1  Nov. 19, 2009

(30) Foreign Application Priority Data

May 16, 2008  (TW) ................................ 97118231 A

(51) Int. Cl.
G06F 3/045  (2006.01)

(52) U.S. Cl.
USPC .......................................... 345/174; 345/173

(58) Field of Classification Search
USPC ...................... 345/173–178; 178/18.01–20.04
See application file for complete search history.

(56) References Cited

U.S. PATENT DOCUMENTS

| | | | | |
|---|---|---|---|---|
| 5,790,106 A | * | 8/1998 | Hirano et al. | 345/173 |
| 6,624,835 B2 | | 9/2003 | Willig | |
| 2005/0052432 A1 | * | 3/2005 | Kraus et al. | 345/173 |
| 2006/0279551 A1 | * | 12/2006 | Lii et al. | 345/173 |
| 2007/0109280 A1 | | 5/2007 | Sigona | |
| 2007/0262964 A1 | | 11/2007 | Zotov et al. | |
| 2008/0309629 A1 | * | 12/2008 | Westerman et al. | 345/173 |
| 2009/0284490 A1 | * | 11/2009 | Chen | 345/174 |

FOREIGN PATENT DOCUMENTS

TW  200502865  1/2005

OTHER PUBLICATIONS

"Search Report of European counterpart application", issued on May 4, 2009, p. 1-p. 7.
"Office Action of Taiwan Counterpart Application", issued on Oct. 26, 2011, p. 1-p. 4, in which the listed references were cited.

* cited by examiner

Primary Examiner — Bipin Shalwala
Assistant Examiner — Ryan A Lubit
(74) Attorney, Agent, or Firm — Jianq Chyun IP Office

(57) ABSTRACT

A method for filtering signals of a touch sensitive device is used to judge whether or not a touch signal output from a touch sensitive device is noise by utilize the arrangement pattern of sensing areas. If the sensing areas corresponding to the touch signal are arranged partially conforming to a noise arrangement pattern the touch signal will be discarded. The present invention uses a scheme of comparing the arrangement diagram of a touch signal with a plurality of noise arrangement patterns to decide whether or not to discard the touch signal so as to increase the accuracy and the stability of a capacitive touch sensitive device.

21 Claims, 8 Drawing Sheets

METHOD FOR FILTERING SIGNALS OF TOUCH SENSITIVE DEVICE

CROSS-REFERENCE TO RELATED APPLICATION

This application claims the priority benefit of Taiwan application serial no. 97118231, filed on May 16, 2008. The entirety of the above-mentioned patent application is hereby incorporated by reference herein and made a part of this specification.

BACKGROUND OF THE INVENTION

1. Field of the Invention

The present invention generally relates to a method for filtering signals, in particular, to a method for filtering signals of a touch sensitive device.

2. Description of Related Art

The progress of the information science and technology provides the people with more convenient products and more comfortable life styles. Now, various information products, such as mobile phone, computer and personal digital assistant (PDA) are everywhere, so that our daily life would be unimaginable without these information products. In order to make the portable information products have a more-humanized operation interface, it is the current trend to integrate a touch panel or a stylus into an information product.

The touch sensitive device in the most common use is mainly categorized into a resistive touch sensitive device and a capacitive touch sensitive device, wherein the capacitive touch sensitive device works mainly based on sensing a signal according to a so-called capacitance electrical characteristic. When two electric conductor layers are not touched by each other but close to each other, the electric fields thereof are inter-acted to form a capacitor. In fact, the surfaces of the upper layer and the lower layer in a touch panel structure are two conductive layers respectively comprising a plurality of conductive layer formed by interlaced conductive traces of electrodes. Note that a human finger is an electric conductor. When a finger is put on a touch panel, a tiny capacitor is generated between the conductive traces of electrodes and the finger, and a microprocessor is used to detect the touch position of the finger of a user by sensing the capacitance variations.

Since a capacitive touch sensitive device is easily caused to produce noise caused by environment variations, such as high-frequency interference source, temperature variation or electrostatic discharge (ESD); consequently, abnormal sensed signals (noise) are produced with the capacitive touch sensitive device, which trigger a fault judgment with the electronic device and waste the electrical power.

SUMMARY OF THE INVENTION

Accordingly, the present invention is related to a method for filtering signals of a touch sensitive device, where the noise produced by a radio-frequency interference source (RF interference source) or environment factors is removed by utilizing the inherent feature of noise that the sensing areas dominated by noise are not contiguously arranged on a touch sensitive device.

The present invention provides a method for filtering signals suitable for a touch sensitive device. The above-mentioned touch sensitive device includes a plurality of sensing areas. The above-mentioned method for filtering signals includes following steps: obtaining a touch signal corresponding to at least a sensing area; determining three contiguous sensing areas comprising a first sensing area, a second sensing area and a third sensing area according to the touch signal, wherein the second sensing area is located between the first sensing area and the third sensing area; discarding the touch signal if the sensing areas corresponding to the touch signal comprise the first sensing area and the third sensing area but without the second sensing area.

In an embodiment of the present invention, the above-mentioned first sensing area and second sensing area are cornerways contiguous to each other.

In an embodiment of the present invention, the above-mentioned third sensing area and second sensing area are sideways contiguous to each other.

The present invention also provides a method for filtering signals suitable for a touch sensitive device. The above-mentioned touch sensitive device includes a plurality of sensing areas. The above-mentioned method for filtering signals includes following steps: obtaining a touch signal corresponding to at least a sensing area; determining contiguous sensing areas comprising a first sensing area, a plurality of second sensing areas and a third sensing area according to the touch signal, wherein the second sensing areas are located between the first sensing area and the third sensing area for separating the first sensing area and the third sensing area from each other; discarding the touch signal if the sensing areas corresponding to the touch signal comprise the first sensing area and the third sensing area but without any one of the second sensing areas.

The present invention further provides a method for filtering signals suitable for a touch sensitive device. The above-mentioned touch sensitive device includes a plurality of sensing areas. The above-mentioned method for filtering signals includes following steps: obtaining a touch signal corresponding to at least a sensing area; determining four contiguous sensing areas comprising a first sensing area, a second sensing area, a third sensing area and a fourth sensing area according to the touch signal, wherein the first sensing area and the third sensing area are cornerways contiguous to each other, and the second sensing area and the fourth sensing area are cornerways contiguous to each other; discarding the touch signal if the sensing areas corresponding to the touch signal comprise the first sensing area and the third sensing area but without the second sensing area and the fourth sensing area.

In an embodiment of the present invention, the above-mentioned touch sensitive device includes a touch pad.

In an embodiment of the present invention, the above-mentioned touch sensitive device is a capacitive touch sensitive device.

In an embodiment of the present invention, the above-mentioned touch sensitive device includes a capacitive touch component.

In an embodiment of the present invention, the locations of the sensing areas are arranged in 3×3 block mode or comb-shape mode.

In an embodiment of the present invention, the sensing areas respectively have an arrow shape.

The present invention utilizes the inherent feature of noise that the sensing areas dominated by noise are not contiguously arranged on a touch sensitive device, but the signal produced by a finger or a conductor features with a single spot arrangement or a continuous arrangement so as to distinguish a normal touch signal from noise. Therefore, the most of touch signals caused by noise can be discarded by judging the arrangement pattern so as to increase the accuracy and the stability of a capacitive touch sensitive device, reduce the chance of fault actions of a system and further achieve a higher efficiency of usability and power-saving.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is an arrangement diagram of sensing areas corresponding noise according to the first embodiment of the present invention.

FIG. 2B is another arrangement diagram of sensing areas corresponding noise according to the first embodiment of the present invention.

FIG. 4 is an arrangement diagram of sensing areas corresponding noise according to the second embodiment of the present invention.

FIG. 5 is an arrangement diagram of sensing areas corresponding noise deducted from the diagrams of FIGS. 2A, 2B and 4.

FIG. 6 is another arrangement diagram of sensing areas corresponding noise according to the second embodiment of the present invention.

FIG. 7 is an arrangement diagram of sensing areas corresponding a normal signal.

DESCRIPTION OF THE EMBODIMENTS

Figure 1:
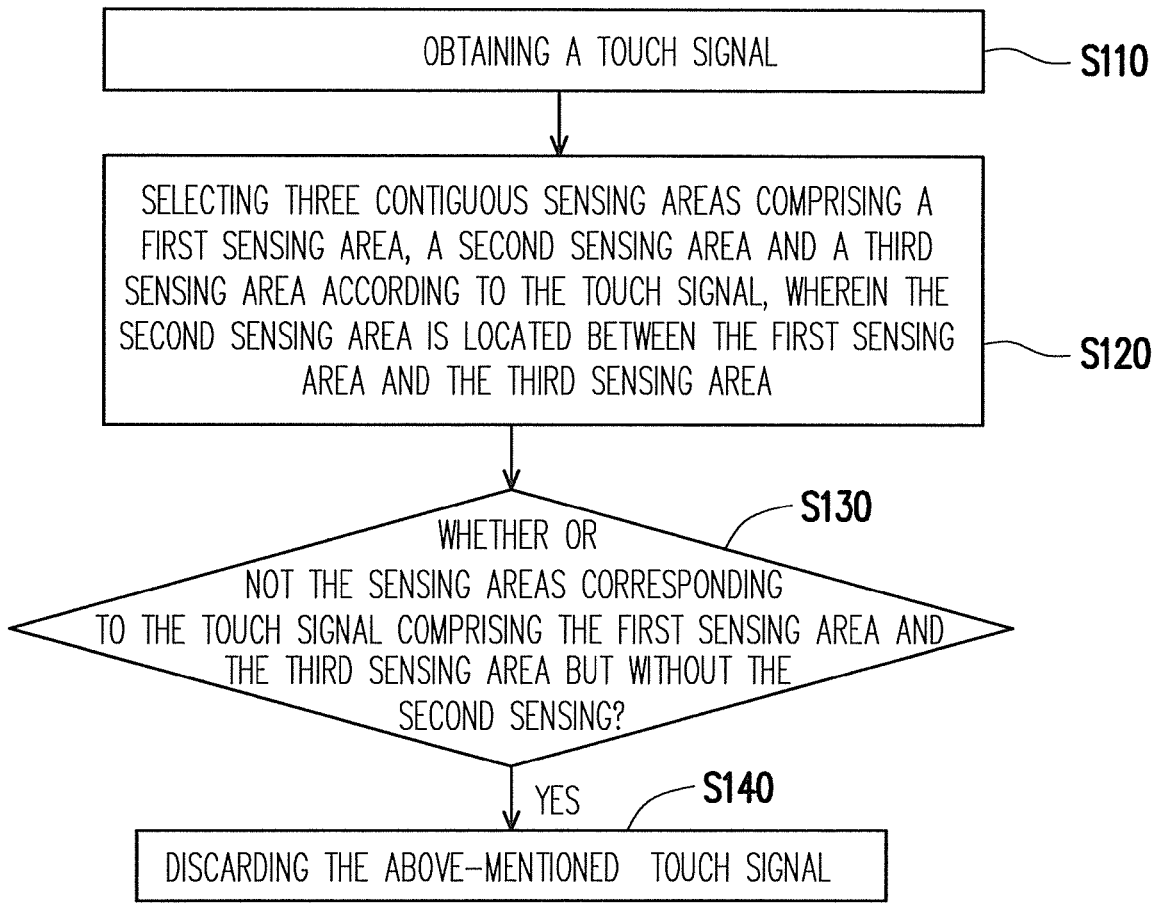
FIG. 1 is a flowchart of the method for filtering signals according to the first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

When a capacitive touch sensitive device (for example, a touch panel or a touch pad) produces noise due to an RF interference source or environment factors, usually a plurality of spots (sensing areas) simultaneously outputs signals and the sensing areas of outputting signals are arranged not contiguously to each other, because the influences of noise or an RF interference source on the touch sensitive device are non-linear and have unpredictable relationships. In contrast, if a finger, a stylus or other conductor touches a touch sensitive device and a touch signal is then produced, the touch signal is usually corresponding to a single spot or contiguous areas, and the sensing areas corresponding to the touch signals are usually contiguous to each other. The present invention utilizes the difference between the signal produced by the above-mentioned noise and the signal produced by a finger and the arrangement pattern of the sensing areas corresponding to the touch signal to discard noise.

When a touch signal is received, the arrangement pattern of the sensing areas corresponding to a touch signal is used by the present invention for judging whether or not the touch signal is noise or a real signal input by a user, wherein the touch signal comprises signals output from the sensing areas of the touch sensitive device to represent the areas touched by a finger or a conductor. If the sensing areas corresponding to the touch signal exhibit a non-contiguous arrangement pattern or a cornerways contiguous arrangement pattern, the touch signal is considered as noise to be discarded.

The First Embodiment

By using the above-mentioned scheme to judge and decide noise, a method for filtering signals of a touch sensitive device provided by the present embodiment can be described in following. The method is suitable to discard a touch signal (noise) produced by an RF interference source or environment factors, and in particular to a capacitive touch sensitive device. A touch sensitive device includes a plurality of sensing areas. Referring to FIG. 1, which is a flowchart of the method for filtering out signals according to the first embodiment of the present invention. First, a touch signal is obtained and the touch signal is corresponding to at least a sensing area (step S110), wherein the touch sensitive device is, for example, a touch panel, a stylus or a touch module, and any of the above-mentioned touch sensitive devices includes a plurality of sensing areas for sensing the touch of a finger or a conductor.

Next, three contiguous sensing areas (i.e., a first sensing area, a second sensing area and a third sensing area) are selected according to the touch signal, wherein the above-mentioned second sensing area is located between the first sensing area and the third sensing area (step S120). Then, it is judged whether or not the sensing areas corresponding to the touch signal include the first sensing area and the third sensing area but without the second sensing area (step S130). If the sensing areas corresponding to the touch signal include the first sensing area and the third sensing area but without the second sensing area, the above-mentioned touch signal is considered as noise to be discarded (step S140); otherwise, the above-mentioned touch signal is considered as a normal signal to be output (not shown).

Note that in step S110, the sensing areas corresponding to the above-mentioned touch signal mean the sensing areas having an output signal or a signal with an intensity equal to or greater than a preset value. In step S120, the so-called contiguous sensing areas include the sensing areas sideways contiguous to each other and the sensing areas cornerways contiguous to each other (i.e., the two contiguous sensing areas are located at a common corner). The so-called three contiguous sensing areas can be three contiguous sensing areas arranged along a line or arranged not along a line, but the middle sensing area must be contiguous to both-side sensing areas (in sideways contiguous mode or in cornerways contiguous mode) so as to separate the sensing areas of both sides thereof from each other (i.e., the sensing areas at both sides are not contiguous to each other). In step S130, the judgement of whether or not the sensing areas corresponding to the touch signal include the first sensing area and the third sensing area but without the second sensing area can be implemented by, for example, image mapping, numerical operation or looking-up table (LUT), which the embodiment is not limited to.

Figure 2A:
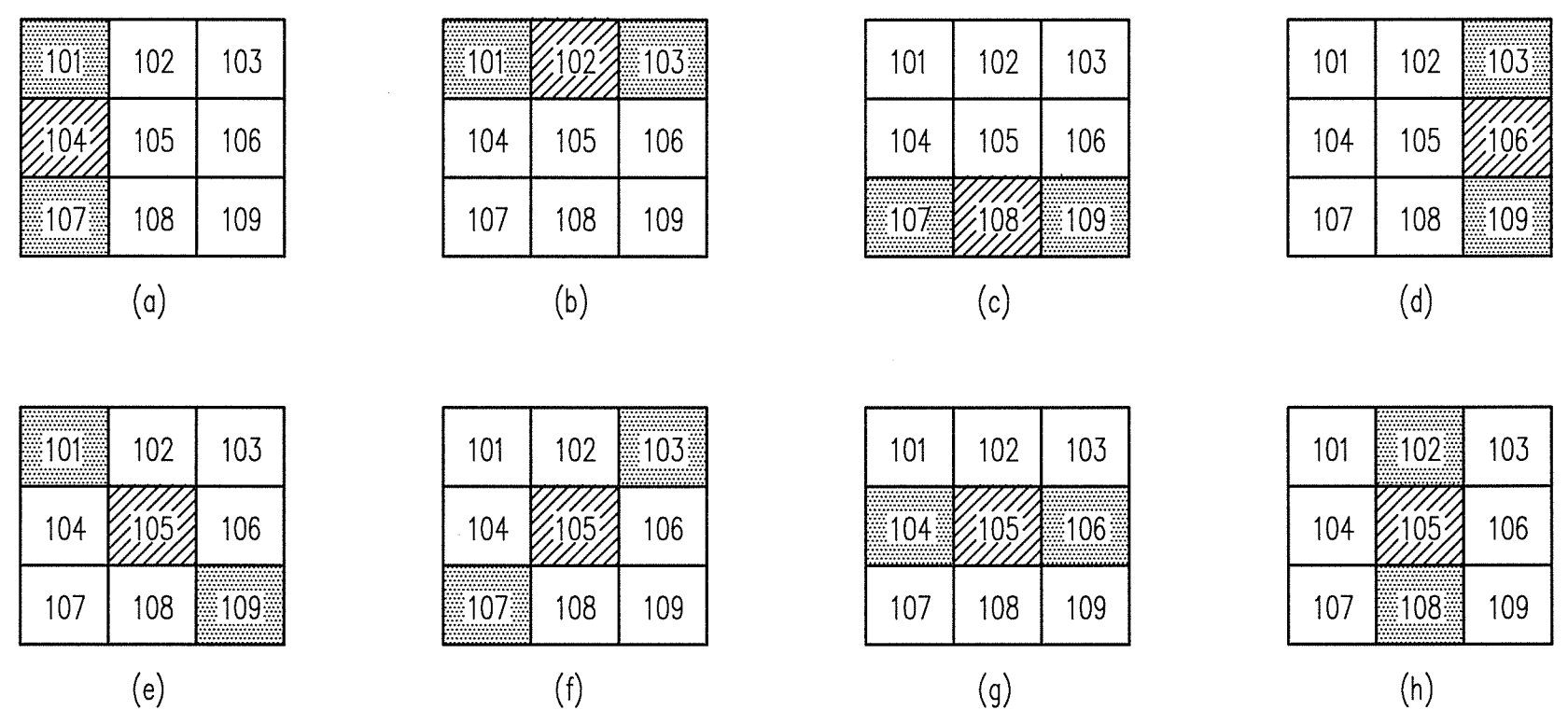

Several arrangement patterns in the embodiment considered as noise arrangement patterns are described in following for explaining the judgement scheme in steps S120 and S130. FIG. 2A is an arrangement diagram of sensing areas corresponding noise according to the first embodiment of the present invention. Referring to FIG. 2A, a touch sensitive device in 3×3 block mode (one of the nine partitions in a Sudoku grid) is exemplarily shown in the embodiment, wherein a plurality of sensing areas 101-109 are respectively a capacitive touch component and the layout of the sensing areas 101-109 is varied depending on the design requirement, for example, a layout of comb-shape mode or a layout of arrow-shape mode, which are omitted for simplicity. In FIG. 2A(a), the sensing areas marked in dots (the sensing areas 101 and 107) represent areas having signal outputs, i.e., the sensing areas corresponding to the touch signal; the sensing area marked in hatching (the sensing area 104) represents an area having no signal outputs; the rest areas are left alone no matter having a signal output or no signal output. If no comparison is conducted, the system would judge out the user has contact the sensing areas 101 and 107 already. However in the embodiment, since the sensing area 104 between the sensing areas 101 and 107 has no signal output (referring to step S130), the touch signal is considered as noise to be discarded.

Continuing to FIG. 2A(a), in step S120, the selected three contiguous sensing areas according to the touch signal are 101, 104 and 107. Then in step S130, to decide the corresponding touch signal is noise or a normal signal it is needed to judge whether or not the sensing areas 101, 104 and 104 respectively output a signal. Since the sensing areas corresponding to the touch signal include the areas 101 and 107 but without the sensing area 104; therefore, the touch signal is considered as noise to be discarded. Note that during conducting the above-mentioned judgment, the rest sensing areas of 102, 103, 105, 106, 108 and 109 (blank ones) are left alone no matter having a signal output or no signal output. All to be considered is whether or not the sensing areas corresponding to the touch signal exhibit an arrangement pattern partly conforming to the arrangement pattern shown by FIG. 2A(a); if it partly conforms to the arrangement pattern of FIG. 2A(a), the touch signal is discarded.

FIGS. 2A(b)-2A(h) illustrate other arrangement patterns of the sensing areas corresponding to the touch signal and the arrangement patterns may be sourced from noise. To judge whether or not a touch signal is noise, the above-mentioned steps S120 and S130 are conducted to compare the arrangement pattern of the touch signal with the arrangement patterns of FIGS. 2A(b)-2A(h). Since the sensing areas (marked in dots) with signal outputs in FIGS. 2A(b)-2A(h) are not contiguous to each other, and the middle sensing areas (marked in hatching) do not output signals (meeting the judgement requirement given by step S130); therefore, in the embodiment, if the sensing areas corresponding to the received touch signal exhibit an arrangement pattern partly conforming to any arrangement pattern of FIGS. 2A(b)-2A(h), the touch signal is considered as noise to be discarded unless a specific setting (for example, a need of a game operation). The other operation detail to use FIGS. 2A(b)-2A(h) to judge whether or not a touch signal is noise can refer to the description of FIG. 2A(a).

In short, in steps S120 and S130, by taking every three sensed areas as a unit and then comparing the sensing areas corresponding to a touch signal with the noise arrangement patterns of FIGS. 2A(a)-2A(h) to decide whether or not the touch signal is noise. If the sensing areas corresponding to the touch signal exhibit an arrangement pattern partly conforming to any arrangement pattern of FIGS. 2A(a)-2A(h), the touch signal is considered as noise to be discarded.

Figure 2B:
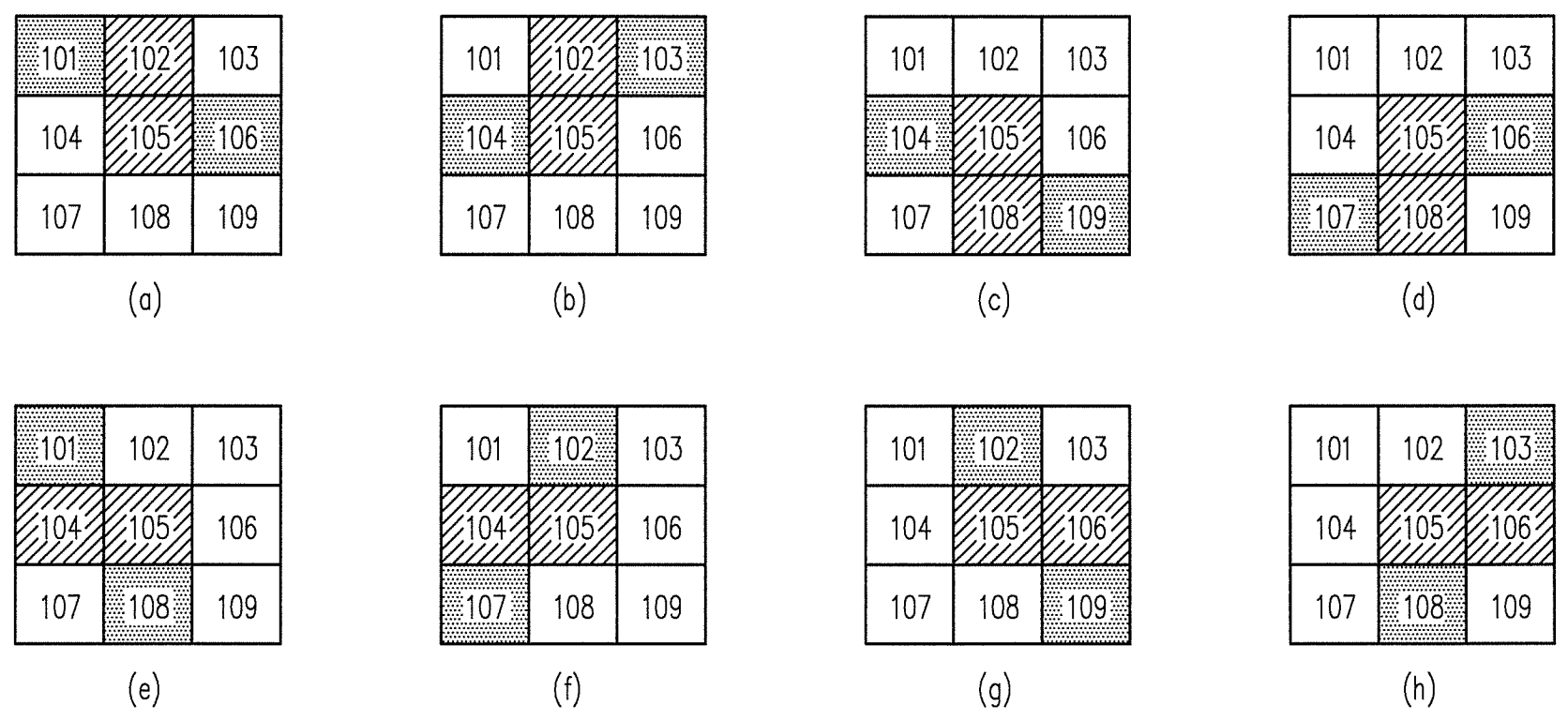

Note that if the sensing areas with signal output are located at two sides and a plurality of sensing areas without signal output is located between the two sides, the touch signal is considered as noise to be discarded. FIG. 2B is another arrangement diagram of sensing areas corresponding noise according to the first embodiment of the present invention. FIGS. 2B(a)-2B(h) illustrate several arrangement diagram of sensing areas corresponding noise. Referring to FIG. 2B(a) as an example, the sensing areas 101 and 106 (marked in dots) herein have signal outputs and are not contiguous to each other, while the middle sensing areas 102 and 105 (marked in hatching) do not output signals; therefore, the touch signal is considered as noise to be discarded. Similarly, if the sensing areas corresponding to a touch signal exhibit one of arrangement pattern of FIGS. 2B(b)-2B(h), the touch signal is considered as noise to be discarded. During a judgment, the blank areas in FIGS. 2B(a)-2B(h) are not in consideration as well; once the sensing areas corresponding to a touch signal exhibit an arrangement pattern partly conforming to an arrangement pattern of FIGS. 2B(a)-2B(h), the touch signal is considered as noise to be discarded.

The flowchart of judging the noise arrangement patterns shown by FIG. 2B can be deducted from the flowchart of a method for filtering signals shown by FIG. 1 except step S120 and step S130 must be modified. The modified step S120 is to select sensing areas contiguous to each other and comprising a first sensing area, a plurality of second sensing areas and a third sensing area according to the touch signal, wherein the second sensing areas are located between the first sensing area and the third sensing area for separating the above-mentioned first sensing area and third sensing area. The modified step S130 is to discard the touch signal if the sensing areas corresponding to the touch signal include the above-mentioned first sensing area and third sensing area but without any one of the above-mentioned second sensing areas. According to the modified flowchart, the arrangement patterns of FIGS. 2B(a)-2B(h) are used to judge whether or not a touch signal is noise to be discarded.

Referring to FIG. 2B(a) as an example, in step S120, the sensing areas 101, 102, 105 and 106 are selected for comparison since a touch signal is corresponding to the sensing areas 101 and 106. Since the sensing areas 102 and 105 do not output signals, the corresponding touch signal is considered as noise to be discarded.

Note that in step S120, the selected sensing areas can exhibit multiple possible patterns (as shown by FIGS. 2A and 2B); therefore, step S120 and step S130 in FIG. 1 can be repeatedly and cyclically conducted to judge whether or not a touch signal has a same noise arrangement pattern through comparing one pattern by one pattern. Alternatively, it can simultaneously generate multiple combinations in step S120, followed by multiple judging whether or not the corresponding touch signal is noise to be discarded in step S130.

The Second Embodiment

Figure 3:
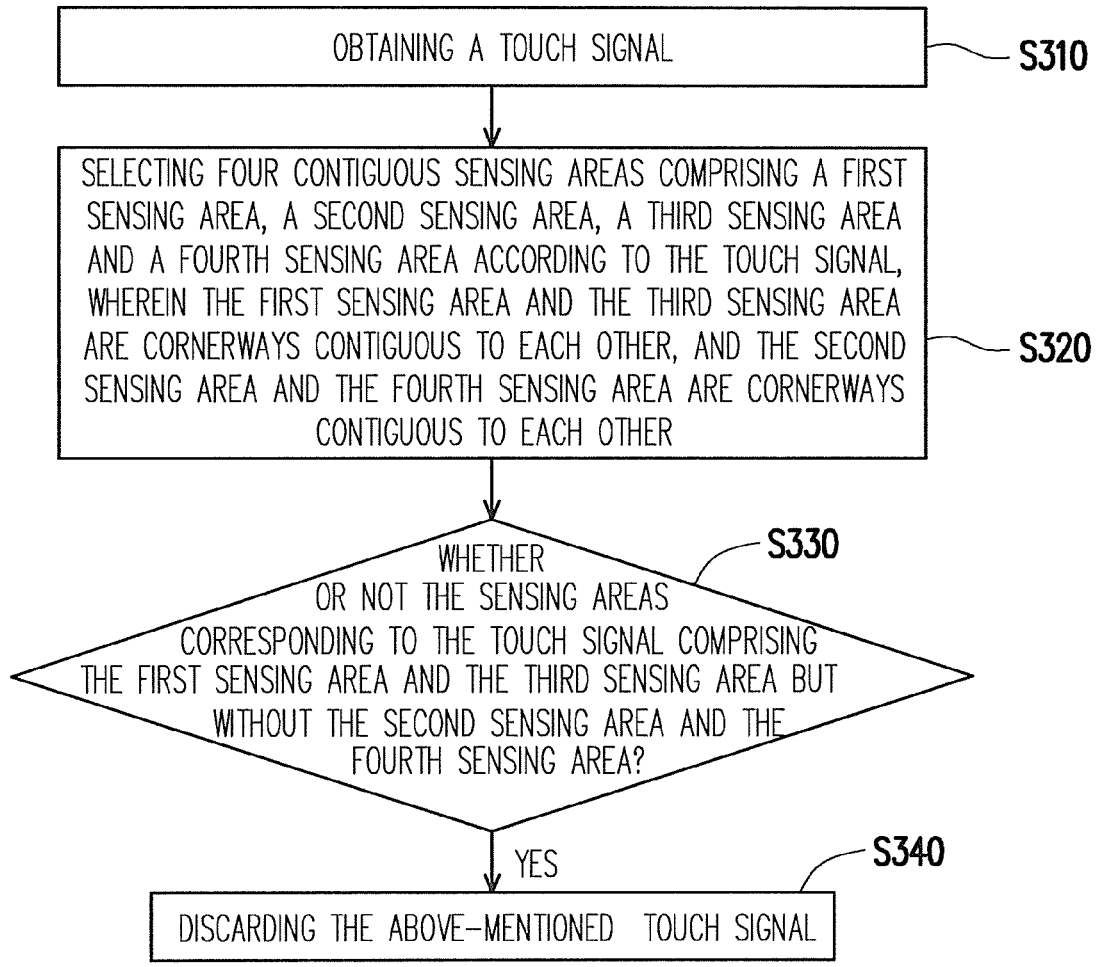
FIG. 3 is a flowchart of the method for filtering signals according to the second embodiment of the present invention.

In another embodiment, a touch signal is considered as noise if the sensing areas corresponding to the touch signal partially conform to a contiguous arrangement pattern. FIG. 3 is a flowchart of the method for filtering signals according to the second embodiment of the present invention. First, a touch signal is obtained and the touch signal is corresponding to at least a sensing area (step S310). Next, four sensing areas contiguous to each other of a first sensing area, a second sensing area, a third sensing area and a fourth sensing area are selected according to the touch signal, wherein the first sensing area and the third sensing area are cornerways contiguous to each other and the second sensing area and the fourth sensing area are cornerways contiguous to each other (step S320). If the sensing areas corresponding to the touch signal include the first sensing area and the third sensing area but without the second sensing area and the fourth sensing area, the above-mentioned touch signal is discarded.

Figure 4:
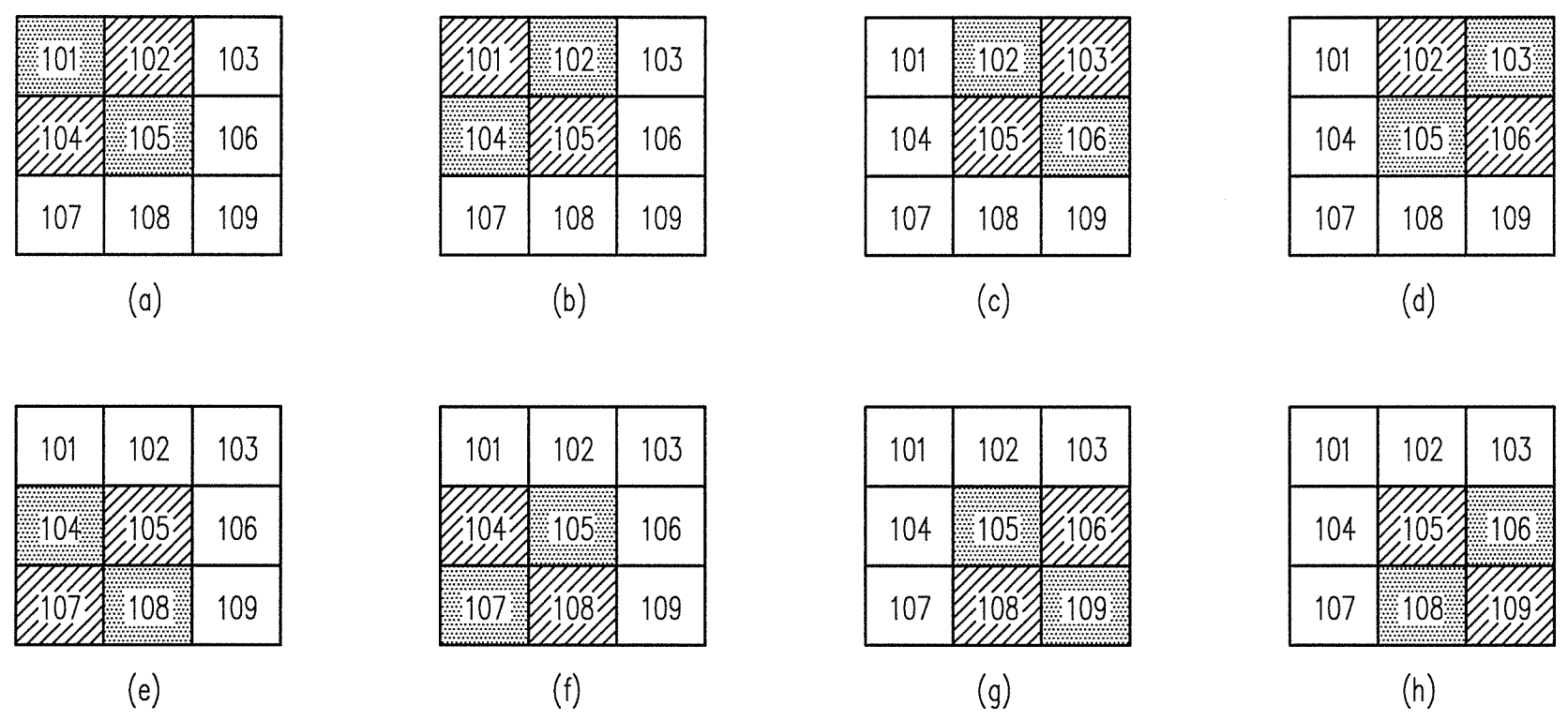

The flowchart of FIG. 3 is mainly provided for judging arrangement patterns of sensing areas corresponding to noise, and the arrangement patterns are shown by FIGS. 4(a)-4(d). FIG. 4 is an arrangement diagram of sensing areas corresponding to noise according to the second embodiment of the present invention, wherein the sensing areas marked in dots indicate to have signal output, the ones marked in hatching indicate no signal output and the blank ones (for example, the sensing areas 103, 106-109) in FIG. 4(a)) are not to be considered. Referring to FIG. 4(a) as an example, the sensing areas corresponding to a touch signal include the sensing areas 101 and 105 (marked in dots), wherein the sensing area 101 is located at a corner of the sensing area 105, which is termed as a cornerways contiguous mode in the embodiment. The sensing areas 102 and 104 sideways contiguous to the sensing area 101 have no signal output. Since the above-mentioned arrangement pattern is unlikely produced when a finger or a conductor touches a touch panel or a touch pad; therefore, the touch signal with the above-mentioned pattern is considered as noise in the embodiment. FIGS. 4(b)-4(d) are similar to FIG. 4(a) except the different arrangements of the sensing areas and thus omitted to describe.

In the above-mentioned steps S320 and S330, every four sensing areas are used as a unit for identifying and then comparing the sensing areas corresponding to the touch signal with the arrangement patterns of FIGS. 4(a)-4(d). If the arrangement pattern partly conforms to a noise arrangement pattern of FIGS. 4(a)-4(d), the touch signal is considered as noise to be discarded. Note that the arrangement patterns of FIGS. 4(a)-4(d) are the noise arrangement patterns given by the embodiment only. Anyone skilled in the art can easily find other noise arrangement patterns according to the spirit of the present invention, which are omitted to describe for simplicity.

Figures 5, 6:
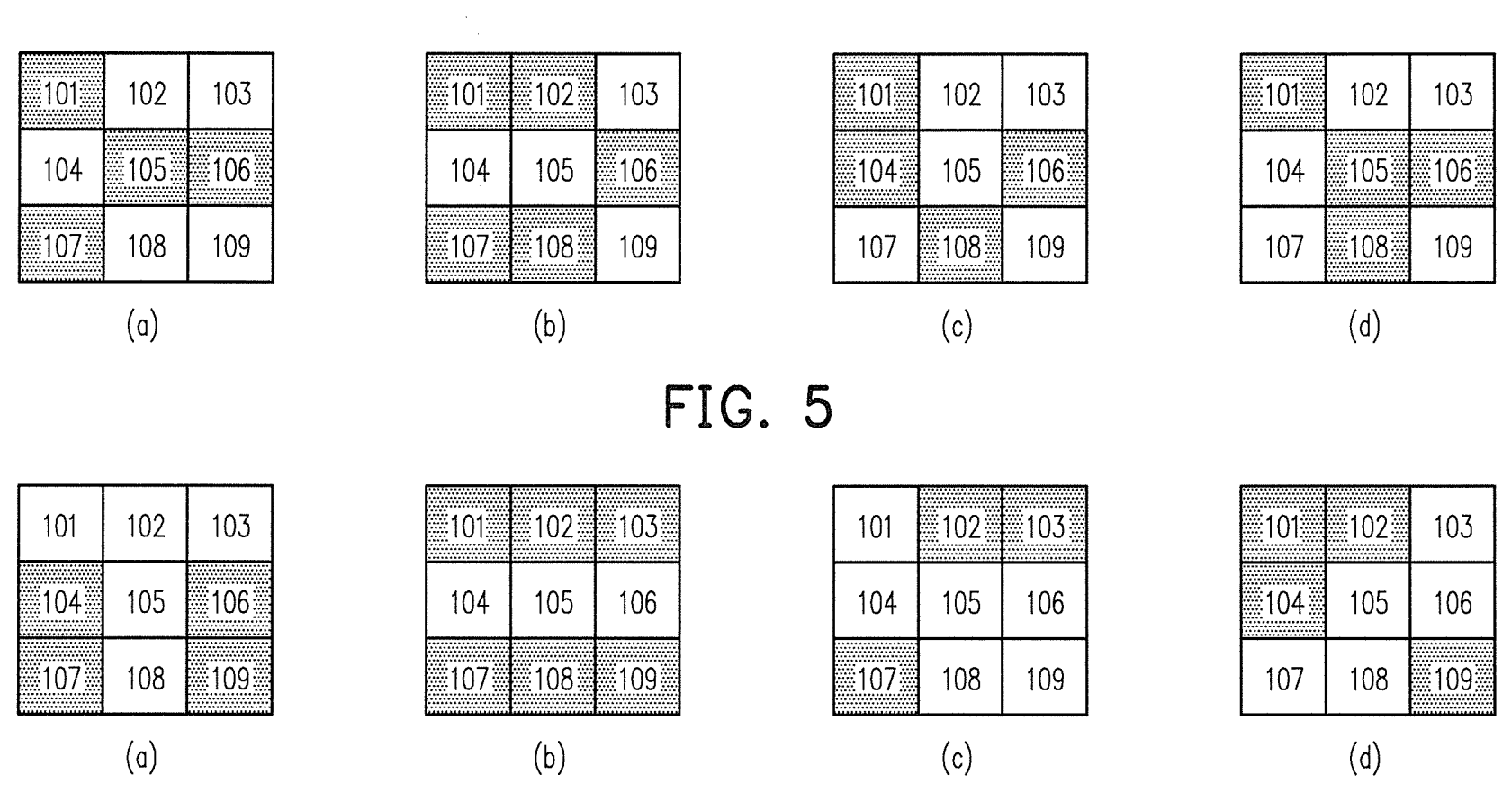

FIG. 5 is an arrangement diagram of sensing areas corresponding noise deduced from the diagrams of FIGS. 2A, 2B and 4. The sensing areas shown by FIGS. 5(a)-5(d) exhibit a cornerways contiguous arrangement pattern and an incontiguous arrangement pattern. If the sensing areas corresponding to a touch signal exhibit an arrangement pattern partly conforming to one of the arrangement patterns in FIG. 5, the touch signal is considered as noise to be discarded.

FIG. 6 is another arrangement diagram of sensing areas corresponding noise according to the second embodiment of the present invention. The sensing areas having signal output in FIGS. 6(a)-6(d) are mainly divided into two incontiguous portions, wherein a part may include a single sensing area or several contiguous sensing areas. Since the arrangement patterns of FIGS. 6(a)-6(d) partly conform to a noise arrangement pattern of FIG. 2A, the corresponding touch signal is considered as noise. Note that if the sensing areas corresponding to a touch signal is one of the two portions in FIGS. 6(a)-6(d) only, for example, the sensing areas 104 and 107 or the sensing areas 106 and 109 in FIG. 6(a), the embodiment would consider the touch signal as a normal signal.

Figure 7:
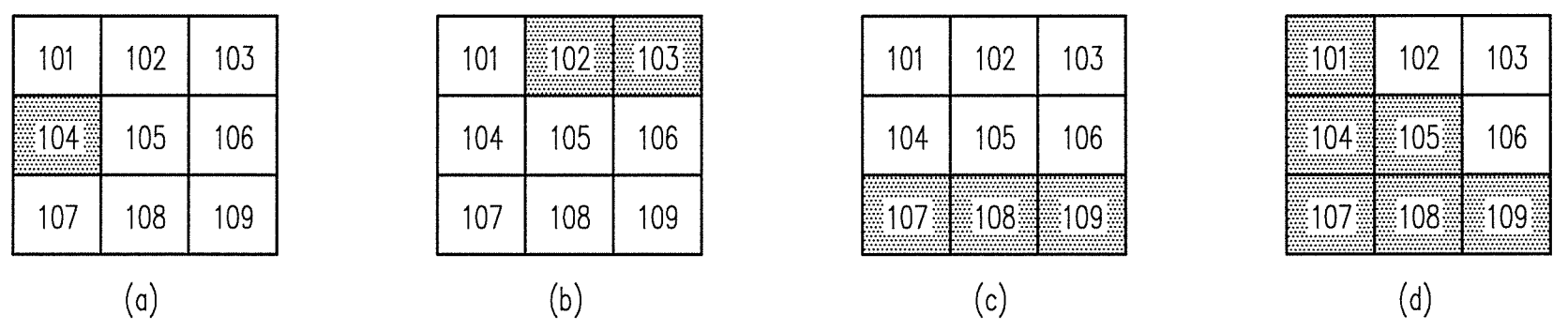

On the other hand, the embodiment can be used to identify a normal signal. When the sensing areas corresponding to a touch signal are a single sensing area or several contiguous sensing areas, the identification steps such as steps S120 and S130 in FIG. 1 would be passed and the above-mentioned touch signal would be identified as a normal signal. FIG. 7 is an arrangement diagram of sensing areas corresponding to a normal signal. Referring to FIGS. 7(a)-7(d), the sensing areas with signal output herein are contiguous to each other and there are no separated sensing areas or no incontiguous sensing areas; therefore, the touch signal herein is identified as a normal signal.

Figure 8:
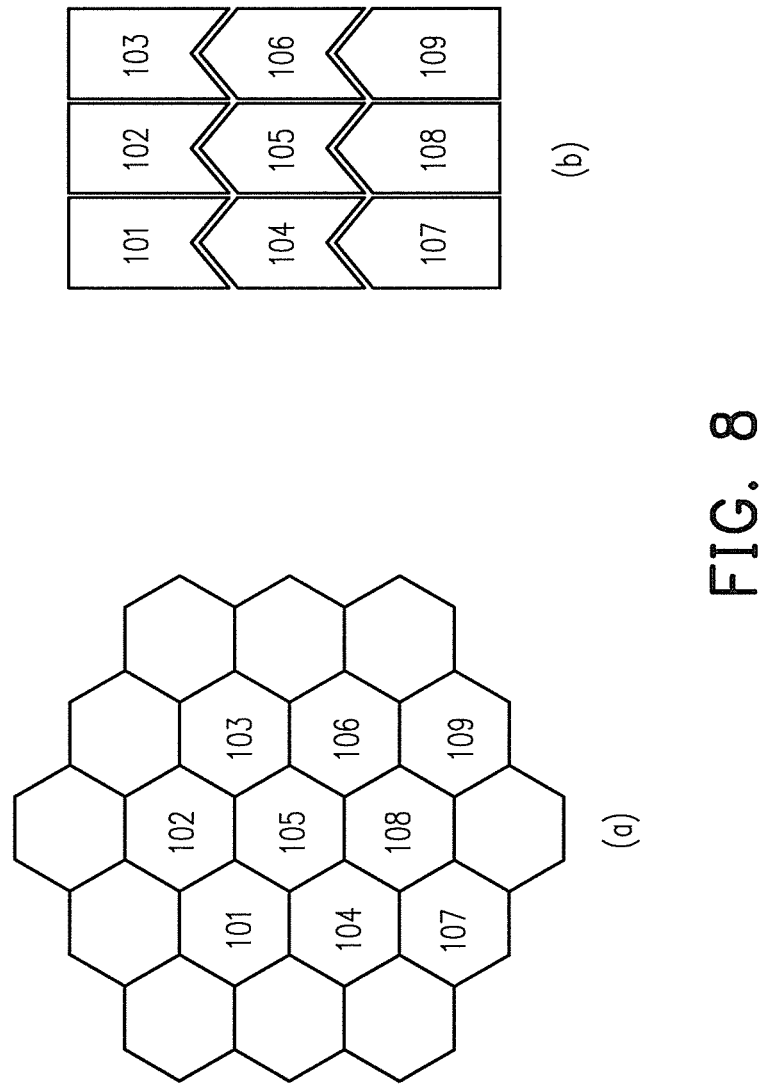
FIG. 8 is a diagram showing a comb-shape layout and an arrow-shape layout of sensing areas according to another embodiment of the present invention.

Although FIGS. 2A, 2B and FIGS. 5-7 illustrate several arrangement patterns of the sensing areas corresponding to noise or a normal signal, but the present invention is not limited to the illustrated ones. Anyone skilled in the art can easily deduct out other arrangement patterns corresponding to noise or a normal signal according to the spirit of the present invention. Similarly, the present invention does not limit the sensing area layout to be the 3×3 block mode. FIG. 8 is a diagram showing a comb-shape layout (FIG. 8(a)) and an arrow-shape layout of sensing areas (FIG. 8(b)) according to another embodiment of the present invention. The other layouts of a touch sensitive device are allowed by the present invention, which are saved to describe.

In summary, the present invention utilizes the difference of the arrangement pattern of the sensing areas corresponding to noise and a normal signal to eliminate noise and reduce the influences of an RF interference source or environment factors, so that the present invention can not only increase the accuracy and the stability of a capacitive touch sensitive device, but also reduce the chance of fault actions of a system and further achieve a higher efficiency of usability and power-saving.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for filtering signals, suitable for a touch sensitive device, wherein the touch sensitive device comprises a plurality of contiguous sensing areas; the method comprising:
configuring the plurality of contiguous sensing areas with predetermined boundaries;
obtaining a touch signal from the touch sensitive device;
determining when the touch signal is considered noise to be discarded, the steps of determining comprising:
in a location from which the touch signal originates, determining from the plurality of sensing areas four contiguous sensing areas comprising a first sensing area, a second sensing area, a third sensing area, and a fourth sensing area wherein the second sensing area is located between the first sensing area and the third sensing area on opposite sides and another side of the second sensing area is directly adjacent to the fourth sensing area which is cornerway adjacent to the first sensing area and the third sensing area; and
discarding the touch signal when the sensing areas which are sensed by the touch sensitive device comprise the first sensing area and the third sensing area and the fourth sensing area but without the second sensing area.

2. The method for filtering signals according to claim 1, wherein the first sensing area and the third sensing area are not contiguous to each other.

3. The method for filtering signals according to claim 1, wherein the first sensing area and the second sensing area are cornerways contiguous to each other.

4. The method for filtering signals according to claim 1, wherein the third sensing area and the second sensing area are cornerways contiguous to each other.

5. The method for filtering signals according to claim 1, wherein the touch sensitive device comprises a touch panel or a touch pad.

6. The method for filtering signals according to claim 1, wherein the touch sensitive device is a capacitive touch sensitive device.

7. The method for filtering signals according to claim 1, wherein each of the sensing areas comprises a capacitive touch sensitive component.

8. The method for filtering signals according to claim 1, wherein the locations of the sensing areas are arranged in 3×3 block mode.

9. The method for filtering signals according to claim 1, wherein the locations of the sensing areas are arranged in comb-shape mode.

10. The method for filtering signals according to claim 1, wherein the sensing areas respectively have an arrow shape.

11. The method for filtering out signals according to claim 1 further comprising:
when it is not determined that the touch signal is considered noise to be discarded, then the touch signal is considered to be a genuine touch signal.

12. A method for filtering signals, suitable for a touch sensitive device, wherein the touch sensitive device comprises a plurality of contiguous sensing areas, the method comprising:
configuring the plurality of contiguous sensing areas with predetermined boundaries;
obtaining a touch signal from the touch sensitive device;
determining when the touch signal is considered noise to be discarded, the steps of determining comprising:
in a location from which the touch signal originates, determining from the plurality of sensing areas contiguous sensing areas comprising a first sensing area, a plurality of second sensing areas, a third sensing area, and a fourth sensing area wherein the plurality of the second sensing areas are located between the first sensing area and the third sensing area on opposite sides for separating the first sensing area and the third sensing area from each other and another side of the plurality of the second areas is directly adjacent to the fourth sensing area which is cornerway adjacent to either the first sensing area or the third sensing area; and
discarding the touch signal when the touch signal corresponds to the first sensing area and the third sensing area and the fourth sensing area but without any one of the second sensing areas.

13. A method for filtering signals, suitable for a touch sensitive device, wherein the touch sensitive device comprises a plurality of contiguous sensing areas; the method comprising:
configuring the plurality of contiguous sensing areas with predetermined boundaries;
obtaining a touch signal from the touch sensitive device;
determining when the touch signal is considered noise to be discarded, the steps of determining comprising:
in a location from which the touch signal originates, determining from the plurality of sensing areas four contiguous sensing areas comprising a first sensing area, a second sensing area, a third sensing area, a fourth sensing area, and a fifth sensing area wherein the first sensing area and the third sensing area are cornerways contiguous to each other, the second sensing area and the fourth sensing area are cornerways contiguous to each other, and the fifth sensing area is directly adjacent to the second sensing area and is cornerway adjacent to the third sensing area; and
discarding the touch signal when the touch signal corresponds to the first sensing area and the third sensing area and the fifth sensing area but without the second sensing area and the fourth sensing area.

14. The method for filtering signals according to claim 13, wherein the first sensing area is further contiguous to the second sensing area and the fourth sensing area, and the third sensing area is also contiguous to the second sensing area and the fourth sensing area.

15. The method for filtering signals according to claim 13, wherein the second sensing area is further contiguous to the first sensing area and the third sensing area, and the fourth sensing area is also contiguous to the first sensing area and the third sensing area.

16. The method for filtering signals according to claim 13, wherein the touch sensitive device comprises a touch panel or a touch pad.

17. The method for filtering signals according to claim 13, wherein the touch sensitive device is a capacitive touch sensitive device.

18. The method for filtering signals according to claim 13, wherein each of the sensing areas comprises a capacitive touch component.

19. The method for filtering signals according to claim 13, wherein the locations of the sensing areas are arranged in 3×3 block mode.

20. The method for filtering signals according to claim 13, wherein the locations of the sensing areas are arranged in comb-shape mode.

21. The method for filtering signals according to claim 13, wherein the sensing areas respectively have an arrow shape.

* * * * *